March 10, 1925.                                            1,528,915
                    A. DIGMANN
                   EXTENSION TRUCK
              Filed March 19, 1924      3 Sheets-Sheet 2
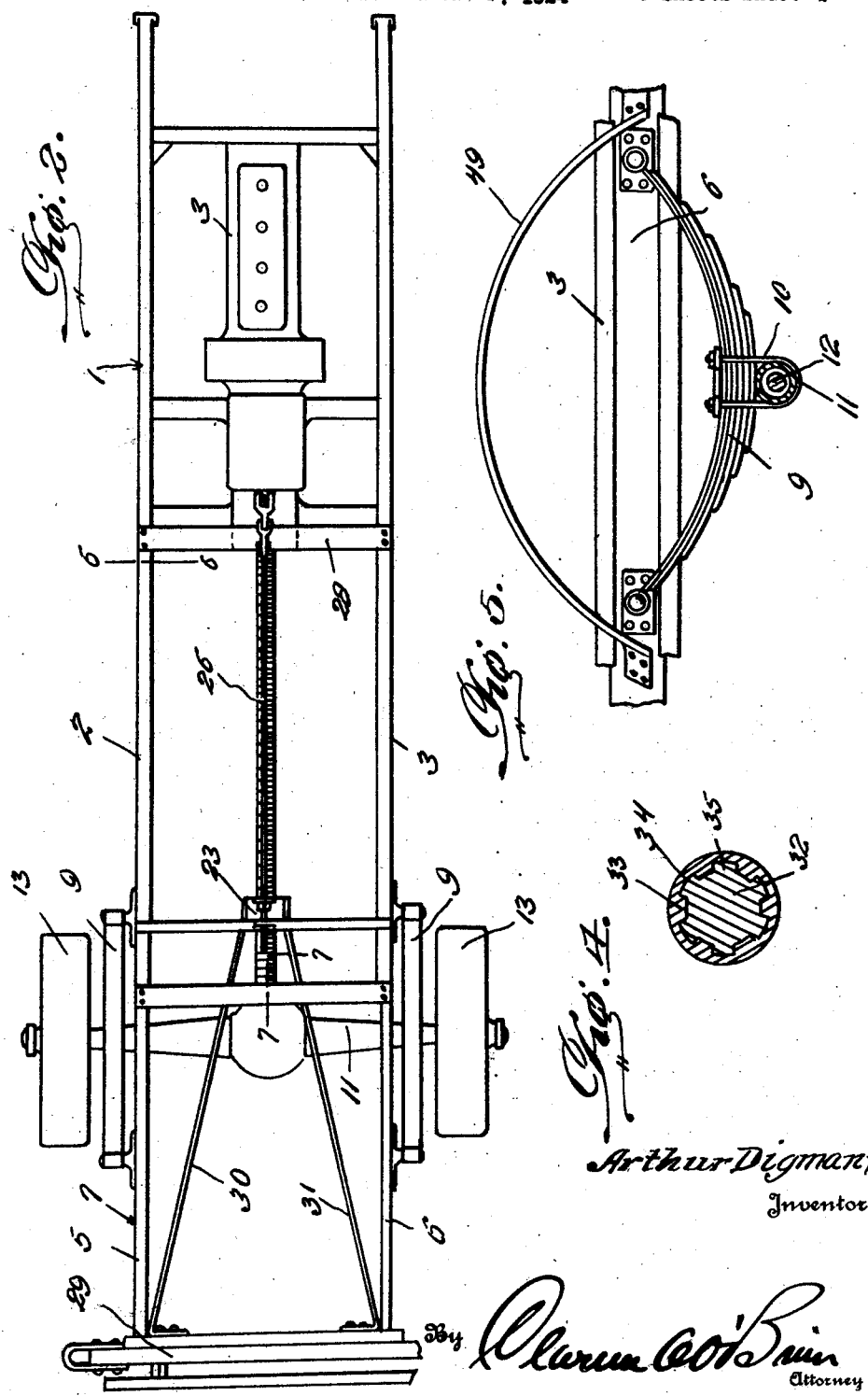

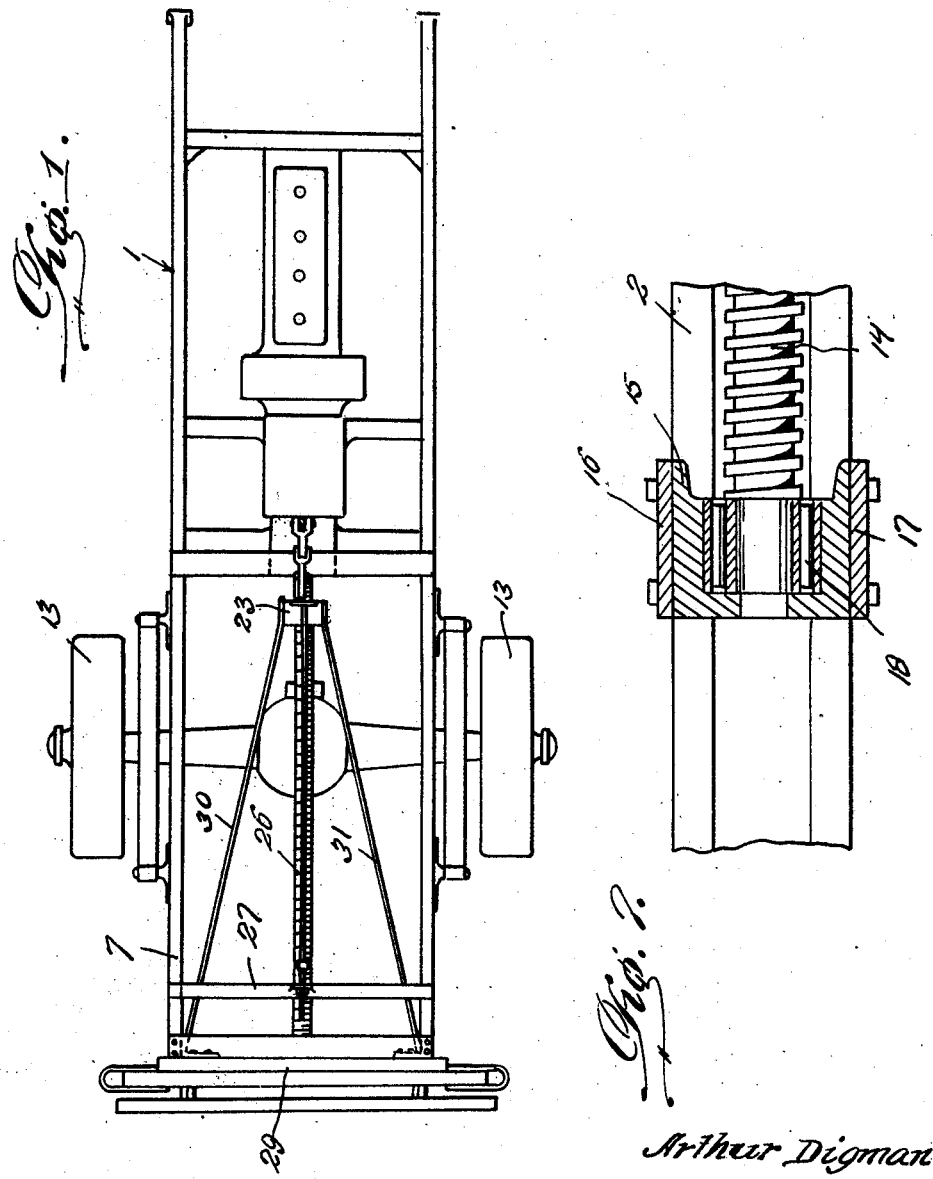

March 10, 1925.
A. DIGMANN
EXTENSION TRUCK
Filed March 19, 1924
1,528,915
3 Sheets-Sheet 3
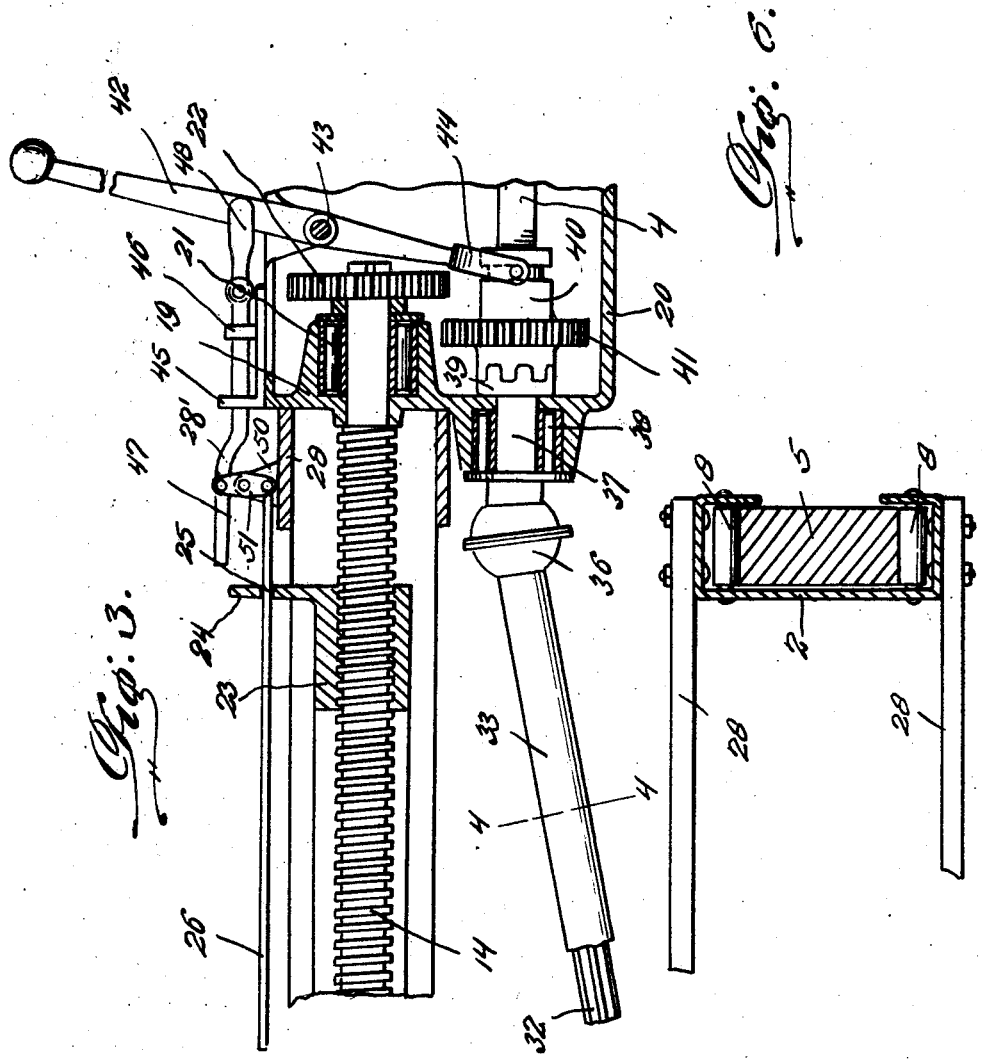
Arthur Digmann
Inventor
By Clarence A O'Brien
Attorney Patented Mar. 10, 1925.

1,528,915

UNITED STATES PATENT OFFICE.

ARTHUR DIGMANN, OF SINSINAWA, WISCONSIN.

EXTENSION TRUCK.

Application filed March 19, 1924. Serial No. 700,336.

*To all whom it may concern:*

Be it known that I, ARTHUR DIGMANN, a citizen of the United States, residing at Sinsinawa, in the county of Grant and State of Wisconsin, have invented certain new and useful Improvements in Extension Trucks, of which the following is a specification.

This invention relates to new and useful improvements in extension trucks and has for its principal object to provide a means whereby the frame of the truck may be adjusted to the desired length simultaneously causing the adjustment of the drive shaft for operating the drive wheels which are associated with the extensible section.

A further object of the invention is to provide an extension truck of the above mentioned character, wherein means is adapted to be drawn into engagement with the drive shaft of a motor vehicle whereby the extensions carried on the rear end of the same may be adjusted longitudinally to the desired length, means being further provided whereby the extensible section will actuate a means for preventing the further inward movement of the extension on the frame of the motor vehicle upon reaching a predetermined position.

A still further object of the invention is to provide an extension truck of the above mentioned character, wherein the same is of such a construction as to enable the extensible section to be readily and easily moved longitudinally on the frame of the vehicle to the desired length without interfering with the operation of the vehicle.

A still further object of the invention is to provide an extension truck of the above mentioned character, wherein guide means is associated with the extensible section for holding the same in proper alignment with respect to the frame while the extensible section is being lengthened or shortened as the case may be.

A still further object of the invention is to provide an extensible truck of the above mentioned character, which is simple in construction, inexpensive, strong and durable, and further, well adapted for the purposes for which it is designed.

Other objects and advantages of this invention will become apparent during the course of the following description.

In the accompanying drawings forming a part of this specification, and in which like numerals designate like parts throughout the same, Figure 1 is a top plan view of my invention showing the extensible section in its normal position on the vehicle body, Figure 2 is a similar view showing the extensible section in an extended position, Figure 3 is an enlarged side elevation of the guide means for the extensible section on the drive shaft of the motor vehicle and other elements associated therewith, parts being shown in section, Figure 4 is a sectional view taken on line 4—4 of Figure 3, Figure 5 is an enlarged detail side elevation of one of the sides of the extensible section showing the same in position on the chassis of the motor vehicle with the axle of the drive wheels supported thereon, Figure 6 is a detail section taken on line 6—6 of Figure 2, and Figure 7 is a sectional view taken on line 7—7 of Figure 2.

In the drawings wherein for the purpose of illustration is shown the preferred embodiment of my invention, the numeral 1 designates generally a motor vehicle of any construction and which includes the channelled sides 2 and 3, respectively. The engine of the motor vehicle 1 is designated generally by the numeral 3 and is also of the well known construction, and it is not thought necessary to further go in detail relative to the same, it being sufficient to state that the drive shaft 4 which extends therefrom has mounted thereon a suitable clutch mechanism which will hereinafter be more fully described.

Adapted for longitudinal movement in the channelled sides 2 and 3 of the frame of the motor vehicle 1 are the side rails 5 and 6 respectively, of the extensible section designated generally by the numeral 7. Suitable roller bearings such as are shown at 8 in the drawings, are supported in the upper and lower portions of each of the channelled sides for permitting the side rails of the extensible section to freely operate therein in the manner as clearly shown in Figure 6 of the drawings. Each of the side rails 5 and 6 have supported thereon adjacent the forward ends thereof, the semi-elliptical leaf-springs 9 and supported by the intermediate portion of each of the leaf-springs is the U-shaped bolt 10 which provides a means for supporting the axle housing 11. Mounted on the outer ends of the rear axle 12 are the usual drive wheels 13. It will thus be seen from the foregoing description, that the axle housing including the axle and drive wheels mounted on the outer ends thereof are all carried by the extensible section 7 and are adapted for movement together with the extensible section in a manner as will be presently apparent.

For the purpose of adjusting the extensible section to the desired length on the frame of a motor vehicle, I provide the longitudinally extended externally threaded shaft 14. The outer end of the shaft 14 is supported in a suitable housing 15 which is mounted on the transversely extending cross bars 16 and 17 respectively, the latter being secured to the rear ends of the channelled sides 2 and 3 in the manner as clearly shown in Figure 2 of the drawings. The outer end of the screw shaft 14 is further adapted to be supported in the roller bearing 18 which is arranged in the housing 15 in the manner as clearly shown in Figure 7 of the drawings. The inner end of the screw shaft 14 extends through the upstanding portion 19 of the housing 20, and is journaled in a suitable roller bearing 21 and carries at its outermost end the gear wheel 22, the purpose of which will be presently described. It will thus be seen from the construction shown in Figures 1 and 2 of the drawings that the screw shaft 14 extends longitudinally on the motor vehicle intermediate the sides thereof.

Adapted for longitudinal movement on the screw shaft 14 is the threaded sleeve 23 which has the upstanding portion 24 thereof provided with a suitable opening 25, the purpose of the opening 25 being to provide a means for engagement with the longitudinally extending rod 26 supported at one end by the cross bar 27 and at its inner end by the pivoted link 51 mounted on the transversely extending member 28. The purpose of this construction is to provide a means for preventing a rotary movement of the sleeve 23 on the screw shaft 14 when the same is in operation. The sleeve 23 is connected to the rear end 29 of the extensible section 7 by means of the arms 30 and 31, respectively, in the manner as clearly shown in Figures 1 and 2 of the drawings. The forward ends of these arms 30 and 31 extend on opposite sides of the housing 15 in which the outer end of the screw shaft 14 is supported and are connected to the sides of the sleeve 23 in any suitable manner.

Co-operating with the sleeve 23 whereby the extensible section 7 may be moved longitudinally on the frame of the vehicle, and to provide a means whereby the rear axle housing and the axle and wheels carried thereby may also be moved therewith, I provide the drive shaft 32 which is connected to the differential in the gear housing 11 in the well known manner, and this drive shaft 32 is adapted for longitudinal slidable movement in the section 33. The shaft 32 has a series of longitudinally extending ribs 34 formed thereon and these ribs are adapted to co-operate with suitable longitudinally formed grooves or channels provided in the section 33 whereby the shaft 32 may move inwardly or outwardly with respect to the sections yet be prevented from rotating independently thereof. The construction of the drive shaft and the co-acting section 33 is more clearly shown in Figure 4 of the drawings. Any suitable universal joint such as is shown at 36 connects the upper ends of the drive shaft 32 and the section 33 to the shaft section of the shafting 37 which extends through the casing 20 journaled in a suitable roller bearing 38 and a clutch member 39 is formed on the inner end of the shaft 37.

A similar clutch member 40 is adapted for slidable movement on the drive shaft 4 and is adapted to mesh with the clutch member 39 for the purposes of actuating the drive shaft 32 and the section 33 co-operating therewith. A gear wheel 41 is mounted on the clutch member 40 and normally is out of engagement with the gear wheel 22 mounted on the inner end of the screw shaft 14.

For the purpose of actuating the clutch member 40, I provide the lever 42 which is pivoted at 43 within the casing 20 and has its lower end provided with the yoke 44 for engagement with the outer end of the clutch member in the usual manner. Pivotally supported intermediate its ends on the bracket 50 is the link 51, the bracket 50 being supported on the transverse member 28. As heretofore described, the lower end of the link is pivotally connected to the inner end of the guide rod 26, while the upper end of the link is pivoted to the outer end of the horizontal lever 47. This horizontal lever extends through registering openings provided in the projections 45 and 46 respectively and the inner end of the lever has engagement with the lever 42 by means of the fork-shaped member 48.

The rear end of the extensible section 7 may be provided with the usual end-gate construction if desirable, and I do not wish to limit myself to the particular construction of the same. It will be also noted in Figure 5 of the drawings that a fender adapted to extend over the wheels 13 is shown at 49 and this fender has its ends connected to the side rails 5 and 6 of the extensible section.

Normally when the truck is in the position as shown in Figure 1 of the drawings, the extensible section is in its innermost position and the drive wheels 13 are driven in the usual manner through the drive shaft of the engine 3. When it is desired to extend the extensible section for a desirable length, so as to accommodate its use for various purposes such as the hauling of lumber or increasing the capacity of the truck to meet the desired demands, the operator shifts the lever 42 so that the gear wheel 41 carried by the clutch member 40 will be brought into engagement with the gear wheel 22 mounted on the inner end of the screw shaft 14. This will cause a simultaneous rotation of the screw shaft 14 and the result of which will cause the longitudinal movement of the sleeve 23 and as the sleeve 23 is connected to the forward ends of the extensible section, the latter will be caused to be moved rearwardly so that the side rails 5 and 6 thereof, will move longitudinally between the rollers 8 in each of the channels 5 of the frame. Simultaneously, the drive shaft 32 will be moved longitudinally within the section 33 so as to permit the axle housing 11 and the axle 12 mounted therein upon which the rear wheels 13 are mounted, to be moved together with the extensible section thereby distributing the load on the motor vehicle truck equally throughout its entire length. After the extensible section has been moved to the desired length, the lever 42 is actuated so as to disengage the gear wheel 41 from the gear wheel 22 and thus hold the extensible section in its proper adjusted position.

When it is desired to return the extensible section 7 to its normal position on the vehicle frame, the usual reversing mechanism of the motor vehicle is moved into operation and by then shifting the lever 42 so that the gear wheel 41 will again engage the gear wheel 22, the shaft 14 will then be rotated in the reverse direction as will also the drive shaft 32 and this will cause the sleeve 23 to move inwardly on the screw shaft 14 and thereby return the extensible section to its normal position. Upon reaching the outer end of the horizontal lever 47, the upstanding portion 24 of the sleeve 23 will move the same inwardly and the inward movement of the lever 47 will simultaneously cause an inward movement and a forward movement of the lever 42 thereby disengaging the gear wheel 41 from the gear wheel 22 so as to prevent the further inward movement of the sleeve 23. This action will return the extensible section 7 to its normal position and the vehicle may then be actuated in the usual manner.

It will thus be seen from the foregoing description, that an extensible truck has been provided wherein the operation of the extensible section may be performed in a very efficient manner and will not affect the operation of the motor vehicle. Furthermore, a device of the above mentioned character, enables a truck of an ordinarily small capacity to be increased to a larger capacity in a simple and efficient manner, and avoids the loss of considerable time.

The simplicity in which my device is constructed enables the same to be readily actuated by the operator of the vehicle without having to leave his seat, and furthermore, the parts are so arranged as to permit ready access to the same whenever necessary.

While I have shown the preferred embodiment of my invention, it is to be understood that various changes in the size, shape and arrangement of parts may be resorted to without departing from the spirit of the invention, and the scope of the appended claims.

Having thus described my invention, what I claim is:—

1. In combination with a vehicle including the frame thereof and the drive shaft of the internal combustion engine mounted thereon; of an extensible section including a pair of side rails adapted for longitudinal movement in the sides of said frame, drive wheels mounted on said slidable sections, a drive shaft connecting the drive wheels to the drive shaft of the internal combustion engine, said last mentioned drive shaft adapted for longitudinal movement, a screw shaft supported on the frame of said vehicle, a sleeve threaded on said shaft and connected to the forward end of said slidable section, means associated with said sleeve for preventing the rotary movement thereof, and means for actuating said screw shaft and the drive shaft connected to the driving wheel simultaneously for moving the same longitudinally with respect to the frame.

2. In combination with a vehicle including the frame thereof and the drive shaft of the internal combustion engine mounted thereon; of an extensible section including a pair of side rails adapted for longitudinal movement in the sides of said frame, drive wheels mounted on said slidable sections, a drive shaft connecting the drive wheels to the drive shaft of the internal combustion engine, said last mentioned drive shaft adapted for longitudinal movement, a screw shaft supported on the frame of said vehicle, a sleeve threaded on said shaft and connected to the forward end of said slidable section, means associated with said sleeve for preventing the rotary movement thereof, means for actuating said screw shaft and the drive shaft connected to the driving wheel simultaneously for moving the same longitudinally with respect to the frame, and means for limiting the inward movement of the slidable section.

In testimony whereof I affix my signature.

ARTHUR DIGMANN.